(12) United States Patent
Norrell et al.

(10) Patent No.: US 7,194,023 B2
(45) Date of Patent: Mar. 20, 2007

(54) LOOP EXTENDER WITH COMMUNICATIONS, CONTROL, AND DIAGNOSTICS

(75) Inventors: Andrew L. Norrell, Nevada City, CA (US); James T. Schley-May, Nevada City, CA (US)

(73) Assignee: 2Wire, Inc., San Jose, CA (US)

( * ) Notice: Subject to any disclaimer, the term of this patent is extended or adjusted under 35 U.S.C. 154(b) by 763 days.

(21) Appl. No.: 10/072,091

(22) Filed: Feb. 6, 2002

(65) Prior Publication Data

US 2002/0106012 A1 Aug. 8, 2002

Related U.S. Application Data

(60) Provisional application No. 60/266,927, filed on Feb. 6, 2001.

(51) Int. Cl.
H04B 1/38 (2006.01)
(52) U.S. Cl. .................. 375/222; 375/211; 379/399.01
(58) Field of Classification Search ................. 375/222
See application file for complete search history.

(56) References Cited

U.S. PATENT DOCUMENTS

| 761,995 | A | 6/1904 | Pupin |
|---|---|---|---|
| 1,711,653 | A | 5/1929 | Quarles |
| 3,180,938 | A | 4/1965 | Glomb |
| 3,476,883 | A | 11/1969 | Birck et al. |
| 3,548,120 | A | 12/1970 | Tarassoff |
| 3,578,914 | A | 5/1971 | Simonelli |
| 3,848,098 | A | 11/1974 | Pinel |
| 3,873,936 | A | 3/1975 | Cho |
| 3,944,723 | A | 3/1976 | Fong |
| 3,962,549 | A | 6/1976 | Zuk |
| 4,025,737 | A | 5/1977 | Brewer |
| 4,131,859 | A | 12/1978 | Valle |
| 4,139,745 | A | 2/1979 | Ashdown et al. |
| 4,242,542 | A | 12/1980 | Kimbrough |
| 4,259,642 | A | 3/1981 | Derby |
| 4,277,655 | A | 7/1981 | Surprenant |
| 4,334,303 | A | 6/1982 | Bertin et al. |
| 4,392,225 | A | 7/1983 | Wortman |
| 4,462,105 | A | 7/1984 | Wagner et al. |
| 4,583,220 | A | 4/1986 | Blackburn et al. |
| 4,633,459 | A | 12/1986 | Blackburn |
| 4,656,628 | A | 4/1987 | Tan |
| 4,667,319 | A | 5/1987 | Chum |
| 4,766,606 | A | 8/1988 | Bardutz et al. |
| 4,768,188 | A | 8/1988 | Barnhart et al. |

(Continued)

FOREIGN PATENT DOCUMENTS

JP            61159833            7/1986

(Continued)

OTHER PUBLICATIONS

U.S. Appl. No. 09/569,470, filed May 12, 2000, DSL Repeater, Brian L. Hinman.

(Continued)

*Primary Examiner*—Temesghen Ghebretinsae
*Assistant Examiner*—Juan Alberto Torres
(74) *Attorney, Agent, or Firm*—Blakely, Sokoloff, Taylor & Zafman LLP

(57) ABSTRACT

In accordance with the present invention, a Digital Subscriber Line (DSL) network for improving the transmission of DSL signals over a local loop is disclosed. The DSL network includes a loop extender with communications, control, and diagnostic functionality, and a central office including a Digital Subscriber Line Access Multiplexer (DSLAM) and a central office controller coupled to the loop extender via the local loop for controlling the loop extender.

49 Claims, 6 Drawing Sheets

U.S. PATENT DOCUMENTS

| | | | |
|---|---|---|---|
| 4,788,657 A | 11/1988 | Douglas et al. |
| 4,970,722 A | 11/1990 | Preschutti |
| 5,049,832 A | 9/1991 | Cavers |
| 5,095,528 A | 3/1992 | Leslie et al. |
| 5,133,081 A | 7/1992 | May |
| 5,181,198 A | 1/1993 | Lechleider |
| 5,394,401 A | 2/1995 | Patrick et al. |
| 5,422,929 A | 6/1995 | Hurst et al. |
| 5,455,538 A | 10/1995 | Kobayashi et al. |
| 5,526,343 A | 6/1996 | Aizawa et al. |
| 5,623,485 A | 4/1997 | Bi |
| 5,678,198 A | 10/1997 | Lemson |
| 5,724,344 A | 3/1998 | Beck |
| 5,726,980 A | 3/1998 | Rickard |
| 5,736,949 A | 4/1998 | Ong et al. |
| 5,765,097 A | 6/1998 | Dail |
| 5,790,174 A | 8/1998 | Richard, III et al. |
| 5,822,325 A | 10/1998 | Segaram et al. |
| 5,825,819 A | 10/1998 | Cogburn |
| 5,859,895 A | 1/1999 | Pomp et al. |
| 5,892,756 A | 4/1999 | Murphy |
| 5,909,445 A | 6/1999 | Schneider |
| 5,912,895 A | 6/1999 | Terry et al. |
| 5,929,402 A | 7/1999 | Charles et al. |
| 5,974,137 A | 10/1999 | Sheets et al. |
| 5,991,311 A | 11/1999 | Long et al. |
| 6,005,873 A | 12/1999 | Amit |
| 6,029,048 A | 2/2000 | Treatch |
| 6,032,019 A | 2/2000 | Chen et al. |
| 6,047,222 A | 4/2000 | Burns et al. |
| 6,058,162 A | 5/2000 | Nelson et al. |
| 6,084,931 A | 7/2000 | Powell, II et al. |
| 6,091,713 A | 7/2000 | Lechleider et al. |
| 6,091,722 A | 7/2000 | Russell et al. |
| 6,128,300 A | 10/2000 | Horton |
| 6,154,524 A | 11/2000 | Bremer |
| 6,188,669 B1 | 2/2001 | Bellenger |
| 6,195,414 B1 | 2/2001 | Simmons et al. |
| 6,208,670 B1 | 3/2001 | Milliron et al. |
| 6,226,322 B1 | 5/2001 | Mukherjee |
| 6,226,331 B1 | 5/2001 | Gambuzza |
| 6,236,664 B1 | 5/2001 | Erreygers |
| 6,236,714 B1 | 5/2001 | Zheng et al. |
| 6,246,695 B1 | 6/2001 | Seazholtz et al. |
| 6,262,972 B1 | 7/2001 | McGinn et al. |
| 6,263,047 B1 | 7/2001 | Randle et al. |
| 6,266,348 B1 | 7/2001 | Gross et al. |
| 6,266,395 B1 | 7/2001 | Liu et al. |
| 6,278,769 B1 | 8/2001 | Bella |
| 6,281,454 B1 | 8/2001 | Charles et al. |
| 6,301,337 B1 | 10/2001 | Scholtz et al. |
| 6,343,114 B1 | 1/2002 | Chea, Jr. |
| 6,345,071 B1 | 2/2002 | Hamdi |
| 6,345,072 B1 | 2/2002 | Liu et al. |
| 6,351,495 B1 | 2/2002 | Tarraf |
| 6,370,188 B1 | 4/2002 | Wu et al. |
| 6,385,234 B1 | 5/2002 | Ashley |
| 6,385,252 B1 | 5/2002 | Gradl et al. |
| 6,385,253 B1 | 5/2002 | Swisher |
| 6,466,656 B1 | 10/2002 | Evans et al. |
| 6,477,178 B1 | 11/2002 | Wakim et al. |
| 6,507,606 B2 | 1/2003 | Shenoi et al. |
| 6,532,279 B1 | 3/2003 | Goodman |
| 6,546,100 B1 | 4/2003 | Drew |
| 6,658,049 B1 | 12/2003 | McGhee et al. |
| 6,681,012 B1 | 1/2004 | Gorcea et al. |
| 6,751,315 B1 | 6/2004 | Liu et al. |
| 6,829,292 B1 | 12/2004 | Shenoi |
| 6,947,529 B2 | 9/2005 | Norrell et al. |
| 2002/0001340 A1 | 1/2002 | Shenoi et al. |
| 2002/0061058 A1 | 5/2002 | Sommer |
| 2002/0090026 A1 | 7/2002 | Ashley |
| 2002/0105964 A1 | 8/2002 | Sommer et al. |
| 2002/0106013 A1 | 8/2002 | Norrell et al. |
| 2002/0106076 A1 | 8/2002 | Norrell et al. |
| 2002/0110221 A1 | 8/2002 | Norrell et al. |
| 2002/0113649 A1 | 8/2002 | Tambe et al. |
| 2003/0051060 A1 | 3/2003 | Vitenberg |

FOREIGN PATENT DOCUMENTS

| | | |
|---|---|---|
| WO | WO 98/59426 | 12/1998 |

OTHER PUBLICATIONS

U.S. Appl. No. 09/610,788, filed Jul. 6, 2000, DSP-Based Repeater for DSL Signals, Brian L. Hinman.

U.S. Appl. No. 09/670,475, filed Sep. 26, 2000, Load Coil and DSL Repeater Including Same, Brian L. Hinman.

U.S. Appl. No. 10/072,833, filed Feb. 6, 2002, Loop Extender with Selectable Line Termination and Equalization, Andrew L. Norrell.

U.S. Appl. No. 10/071,980, filed Feb. 6, 2002, Line Powered Loop Extender with Communications, Control, and Diagnostics, Andrew L. Norrell.

"Reference Data for Radio Engineers", Published by the Federal Telephone and Radio Corporation as associate of International Telephone and Telegraph Corporation, Copyright 1943, pp. 3.

Todd Baker, "The Challenges of Implementing", Tektronix, Oct. 1998 CTE Report, http://www.tektronix.org/Measurement/commtest/cte_reports/27/xdsl.html?view=print&page=http://ww, pp. 5.

Vince Vittore, "Telephony Making DSL go for the long run", http://industryclick.com/magazinearticle.asp?magazinearticleid=7521&magazineid=7&mode=print, Dec. 11, 2000, pp. 2.

Nilsson, J.W., and Riedel, S.A., "Electric Circuits," 1996, pp. 723-777, Fifth Edition, Addison-Wesley, Reading, MA.

Starr, Thomas, et al., "Understanding Digital Subscriber Line Technology,"Prentice Hall PTR, Upper Saddle River, NJ, 07458, 1999, ISBN 0137805454, pp. 1-52.

Chen, Walter Y., "DSL Simulation Techniques and Standards Development for Digital Subscriber Line Systems," Macmillan Technical Publishing, Indianapolis, Indiana, ISBN 1578700175, pp. 3-33.

"Smart Coil™ —The line conditioner for the digital age! Smart Coils condition copper pairs for deployment of both ADSL (data) and toll-quality voice services on the same line," Charles a registered Trademark of Charles Industries, LTD., 2 pages.

"Testing Inter-Winding Capacitance," Rhombus Industries, Inc., Huntington Beach, California, 1997, 1 page.

"Transformer General Parameters for Telecom Magnetic Component," Delta Products Corporation, Fremont, California, 1 page.

"Design Idea DI-61 TinySwitch®-II 3 W Charger: <200 mW No-Load Consumption," Power® Integrations, www.powerint.com, Mar. 2004, 2 pages.

"Lundahl Transformers, Tube amplifier transformers, OPTs, mains, and interstage transformers," http://www.lundahl.se/tubes.html, Apr. 13, 2004, pp. 1-7.

"TechEncyclopedia," TechWeb, http://www.techweb.com/encyclopedia/defineterm?term=dsl&x=20&y=5, Apr. 16, 2004, pp. 1-4.

Grossner, Nathan R., "The Wide-Band Transformer: Synthesis," and "The Pulse Transformer: Analysis," Transformers for Electronic Circuits, Copyright © 1967, by McGraw-Hill, pp. 225-252.

Supplementary European Search Report dated Feb. 22, 2006, Application No. EP02709456, 2 pages.

"Copper Trunk HDSL Repeater", 1999, XP002181004 Retrieved from the Internet: URL: http://web.archive.org/web/20001217100200/http://www.orckit.com/hdsl_repeater.ht ml> Retrieved on Oct. 23, 2001.

Patent Abstracts of Japan, vol. 010, No. 363 (E-461), Publication No. 61159833, Publication Date Jul. 19, 1986, Application No. 59264179, Application Date Dec. 14, 1984.

BACKGROUND

LOOP EXTENDER WITH COMMUNICATIONS, CONTROL, AND DIAGNOSTICS

CROSS REFERENCE TO RELATED APPLICATIONS

This application is related to, and claims the benefit of, U.S. Provisional Patent Application No. 60/266,927, filed on Feb. 6, 2001 and entitled "ADSL Repeater with Communication, Control, and Diagnostics." This application also relates to commonly assigned U.S. patent application Ser. No. 09/569,470, filed on May 12, 2000 and entitled "DSL Repeater," now abandoned, U.S. patent application Ser. No. 09/610,788, filed on Jul. 6, 2000 and entitled "DSP-Based Repeater for DSL Signals," now abandoned, U.S. patent application Ser. No. 09/670,475, filed on Sep. 26, 2000 now issued as U.S. Pat. No. 7,072,385 and entitled "Load Coil And DSL Repeater Including Same," U.S. patent application Ser. No. 10/072,833 filed on Feb. 6, 2002, and entitled "Loop Extender with Selectable Line Termination and Equalization," and U.S. patent application Ser. No. 10/071,980 filed on Feb. 6. 2002, and entitled "Line Powered Loop Extender with Communications, Control, and Diagnostics." The disclosures of these related applications are hereby incorporated by reference.

BACKGROUND OF THE INVENTION

1. Field of the Invention

The present system and method relate generally to Digital Subscriber Line (DSL) technology, and more particularly to a system and method for improving ADSL (Asymmetric DSL) and VDSL (Very high data rate DSL) system performance over long local loops.

2. Description of the Background Art

One method of accessing the Internet is by using DSL technology, which has several varieties, including ADSL and VDSL versions. ADSL is one version of DSL technology that expands the useable bandwidth of existing copper telephone lines. ADSL is "asymmetric" in that ADSL reserves more bandwidth in one direction than in the other, which may be beneficial for users who do not require equal bandwidth in both directions. In one implementation, ADSL signals generally occupy the frequency band between about 25 kHz and 1.104 MHz. In this configuration, ADSL uses the frequency band between about 25 kHz and 120 kHz to transmit upstream signals (signals from a customer premises to a central office) and the frequency band between about 150 kHz to 1.104 MHz to transmit downstream signals (signals from the central office to a customer premises).

ADSL employs Frequency Division Multiplexing (FDM) to separate upstream and downstream signals and to separate ADSL signals from POTS (Plain Old Telephone Service) band signals, which reside below 4 kHz. VDSL also uses FDM to separate downstream and upstream channels as well as to separate both downstream and upstream channels from POTS signals.

In the past, ADSL has been used to deliver high-speed data services to subscribers up to about 18,000 feet from their serving central office or central office extension. The potential data rates range from above about 8 MBPS for short loops, but drop off dramatically on long loops, such as local loops over about 18,000 feet, to about 0.5 MBPS or less. Conventionally, ADSL service generally employs a local loop length of about 6,000–14,000 feet for optimal service. Loop length is generally defined as the length of the wire between the central office, or central office extension, and the customer premises, such as a home or business. "Central office" and "central office extension" are collectively referred to herein as "central office."

DSL signals generally degrade as they traverse the local loop. Hence, the longer the local loop length, the more degraded the DSL signal will tend to be upon arriving at a central office or a customer premises. While some DSL service is conventionally possible with loop lengths longer than 14,000 feet, it has been found that with loops much longer than about 14,000 feet, the DSL signal is too degraded to provide high data transfer rates.

DSL signal degradation over a local loop may be caused, for example, by factors such as: signal attenuation, crosstalk, thermal noise, impulse noise, and ingress noise from commercial radio transmitters. The dominant impairment, however, is often signal attenuation. For example, a transmitted ADSL signal can suffer as much as 60 dB or more of attenuation on long loops, which substantially reduces the useable signal, greatly reducing potential data rates.

Additional details regarding DSL signal degradation over long loops and regarding DSL technology more generally are described in *Understanding Digital Subscriber Line Technology* by Starr, Cioffi, and Silverman, Prentice Hall 1999, ISBN 0137805454 and in *DSL—Simulation Techniques and Standards Development for Digital Subscriber Line Systems* by Walter Y. Chen, Macmillan Technical Publishing, ISBN 1578700175, the disclosures of which are hereby incorporated by reference.

SUMMARY OF THE INVENTION

In accordance with the present invention, a DSL network for improving the transmission of DSL signals over a local loop is disclosed. The DSL network includes a loop extender with communications, control, and diagnostic functionality, and a central office including a DSLAM and a central office controller coupled to the loop extender via the local loop for controlling the loop extender.

In one embodiment of the present invention, the central office controller includes a modem, a processor coupled to the modem, and loop extender management software executable by the processor for generating control signals. The processor sends the control signals to the modem for transmission over the local loop in the voice frequency band when POTS signals are not present on the local loop. In addition, the DSLAM includes an ATU-C coupled to the local loop configured to receive and transmit DSL signals and a DSLAM controller coupled to the processor and the ATU-C configured to control access to the local loop. Furthermore, the processor may receive local loop information from the DSLAM controller and may send instructions to the DSLAM controller for operating the ATU-C.

In one embodiment of the present invention, the loop extender includes a POTS loading coil adapted to be coupled to the local loop for improving transmission of POTS band signals over the local loop, a diagnostic/control unit (DCU) coupled to the local loop for providing communications, control, and diagnostic functionality, and amplification circuitry capacitively coupled to the local loop via bypass switches for providing DSL signal amplification.

In one embodiment, the DCU includes a modem coupled to the local loop for communication with the central office controller, an analog multiplexer/analog-to-digital converter (AMADC) coupled to the amplification circuitry for sampling DSL signal data via diagnostic lines, and a diagnostic/control processor (DCP) coupled to the modem and the AMADC for processing the control signals received via the modem and analyzing the sampled DSL signal data from the AMADC.

The DCP may process the sampled DSL signal data to compute average power, peak power, root-mean-square power, and power spectral density, for example. The DCP, upon receiving control signals from the central office controller, may uncouple the amplification circuitry from the local loop by activating a deactivated bypass relay, or may couple the amplification circuitry to the local loop by deactivating an activated bypass relay.

DETAILED DESCRIPTION OF THE DRAWINGS

Figure 1:
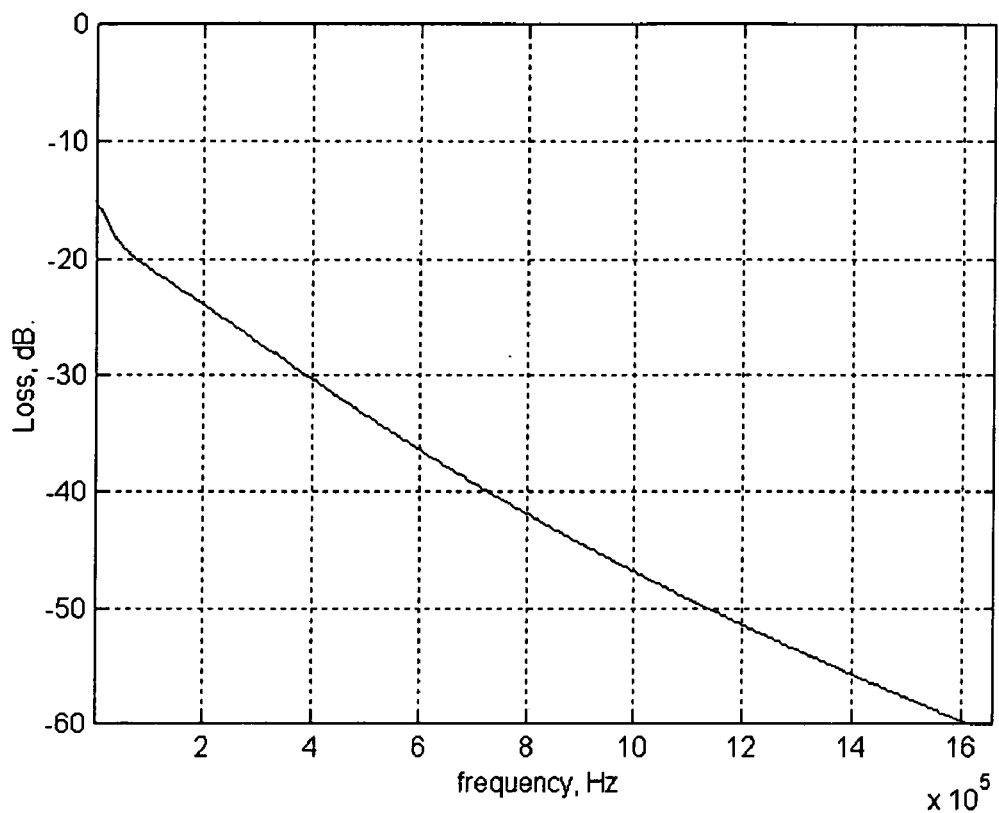
FIG. 1 is a graph illustrating one example of DSL signal attenuation over a 6,000-foot length of telephone cable as a function of signal frequency.

FIG. 1 illustrates an example of the attenuation of a DSL signal over 6,000 feet of 26 AWG (American Wire Gauge) telephone cable. As shown, higher frequency signals are generally attenuated more than lower frequency signals. In the FIG. 1 example, a 250 kHz signal is attenuated by about 25 dB over 6,000 feet of 26 AWG telephone cable while a 1 MHz signal is attenuated by about 46 dB over 6,000 feet of 26 AWG telephone cable. As those skilled in the art will appreciate, the actual degree of attenuation will also depend on factors in addition to loop length, such as temperature.

Figure 2:
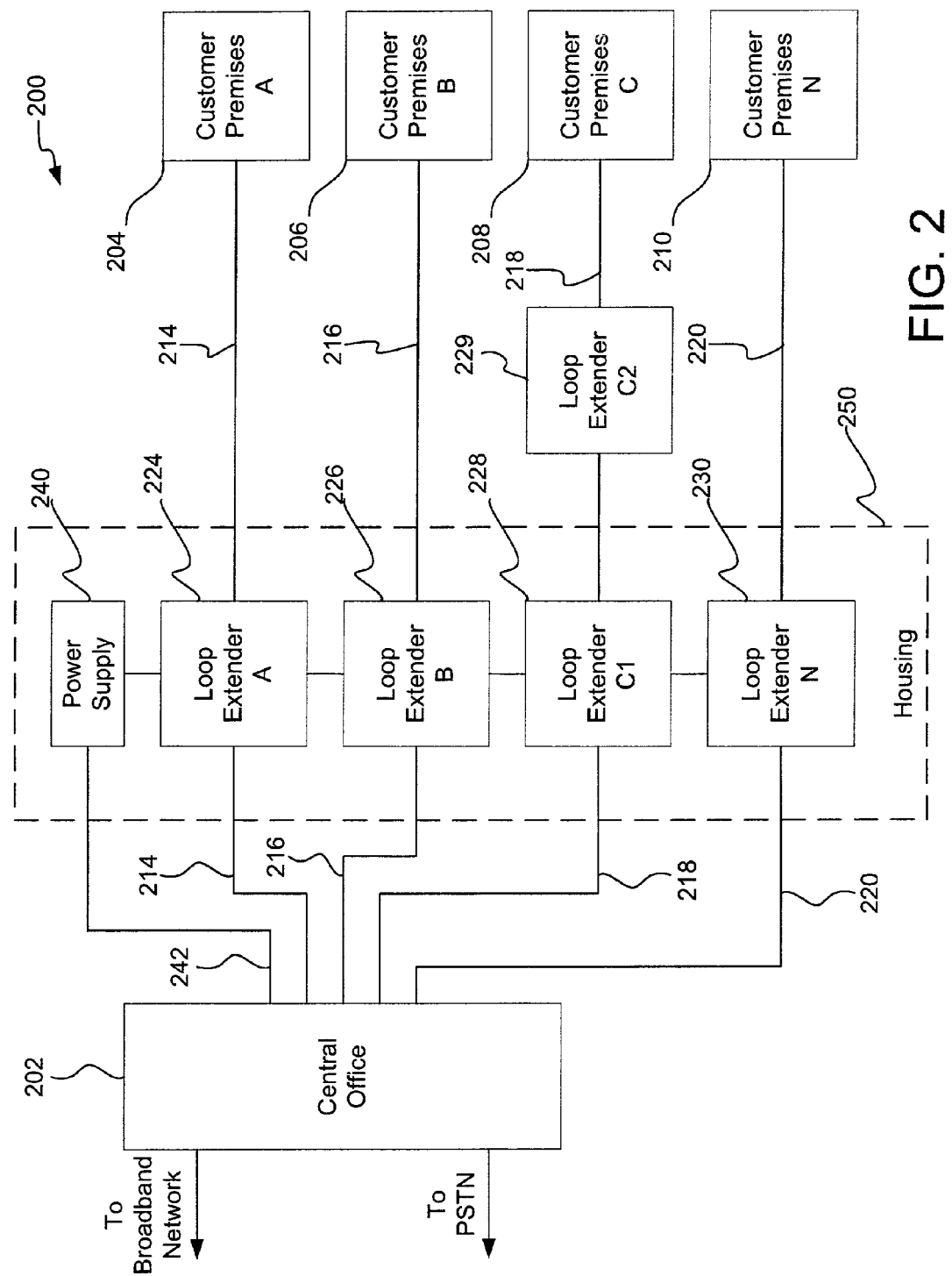
FIG. 2 illustrates multiple local loops interconnecting a central office and multiple customer premises with each local loop having at least one loop extender coupled thereto.

FIG. 2 illustrates a DSL network 200 that includes a central office 202, a customer premises A 204, a customer premises B 206, a customer premises C 208, and a customer premises N 210. Customer premises 204, 206, 208, and 210 are respectively coupled to central office 202 by local loops 214, 216, 218, and 220. Each local loop comprises a twisted pair of copper wires; commonly know in the art as a "twisted pair." Typically, the copper wires are formed of 22, 24, or 26 AWG wire.

Moreover, as those skilled in the art will appreciate, central office 202 and each of customer premises 204, 206, 208, and 210 includes a DSL termination device, such as a DSL modem, for transmitting and receiving DSL signals over an associated local loop. Details of central office 202 will be discussed further below in conjunction with FIG. 6.

A loop extender 224, also called a DSL repeater, is coupled to local loop 214 to amplify DSL signals, such as ADSL or VDSL signals, passing over local loop 214 between central office 202 and customer premises 204. As discussed above, DSL signals are generally attenuated as they travel along a local loop, such as local loop 214. Loop extender 224 is disposed along local loop 214 between central office 202 and customer premises 204 to at least partially compensate for the DSL signal attenuation by amplifying the transmitted DSL signals. Additional details of loop extender 224 are described below with reference to FIGS. 3–5.

In addition, a loop extender 226 is coupled to local loop 216 between central office 202 and customer premises 206 to amplify DSL signals passing between central office 202 and customer premises 206. Likewise, a loop extender 230 is disposed between central office 202 and customer premises 210 to amplify DSL signals passing therebetween. Loop extenders 226 and 230 are configured the same as loop extender 224.

Further, FIG. 2 illustrates that multiple loop extenders may be coupled in series, or in cascaded fashion, to a single loop for amplifying transmitted DSL signals multiple times and in multiple locations between a customer premises and central office 202 to permit DSL signals to be transmitted over greater distances while still maintaining an acceptable DSL signal amplitude. Specifically, loop extender 228 and loop extender 229 are coupled in series to local loop 218, which couples central office 202 and customer premises 208. Pursuant to this configuration, loop extender 228 first amplifies a downstream DSL signal transmitted from central office 202 over local loop 218 to customer premises 208 and loop extender 229 then amplifies the downstream signal again.

Hence, loop extender 228 amplifies the downstream signal to at least partially compensate for the attenuation incurred as the downstream signal passes over the portion of local loop 218 between central office 202 and loop extender 228. Next, loop extender 229 amplifies the downstream signal to at least partially compensate for the attenuation incurred as the downstream signal passes from loop extender 228 to loop extender 229.

Likewise, for upstream DSL signals from customer premises 208 to central office 202, loop extender 229 amplifies the upstream signals to at least partially compensate for the attenuation that occurs between customer premises 208 and loop extender 229. Next, loop extender 228 amplifies the upstream signal to at least partially compensate for the attenuation incurred as the upstream signal passes from loop extender 229 over local loop 218 to loop extender 228.

According to one embodiment, loop distance between loop extenders 228 and 229 is between about 5,000 and 7,000 feet. In a preferred embodiment, the loop distance between loop extenders 228 and 229 is about 6,000 feet. As discussed in more detail below, this loop distance between multiple loop extenders disposed in series, in cascaded fashion, along a single local loop may be advantageous in that pursuant to other embodiments of the present system and method, each loop extender may be adapted with POTS loading coils (see FIG. 4 and FIG. 5). These other embodiments may then replace conventional POTS loading coils, which are disposed about every 6,000 feet along a local loop to provide both POTS loading and DSL signal amplification functionality. Additional details of these other embodiments are discussed below with reference to FIG. 4 and FIG. 5.

Local loop 218 is illustrated as having two cascaded loop extenders 228 and 229 coupled thereto between central office 202 and customer premises 208. It should be noted, however, that additional loop extenders (not shown) may be disposed in series between central office 202 and customer premises 208 so that DSL signals may be effectively transmitted over an even longer local loop 218 by being amplified multiple times by multiple loop extenders.

In the embodiment illustrated in FIG. 2, loop extenders 224, 226, 228, and 230 receive electrical power from a power supply 240, which preferably receives power over a twisted pair 242 from central office 202. Twisted pair 242 is a dedicated twisted pair that delivers DC current to power supply 240 in the same manner in which electrical power is conventionally provided to T1 line repeaters. While not separately illustrated, loop extender 229 may receive power from a separate dedicated twisted pair or may receive power from power supply 240. Lastly, power supply 240; loop extenders 224, 226, 228, and 230; and the associated circuitry may be disposed in a common housing 250.

Figure 3:
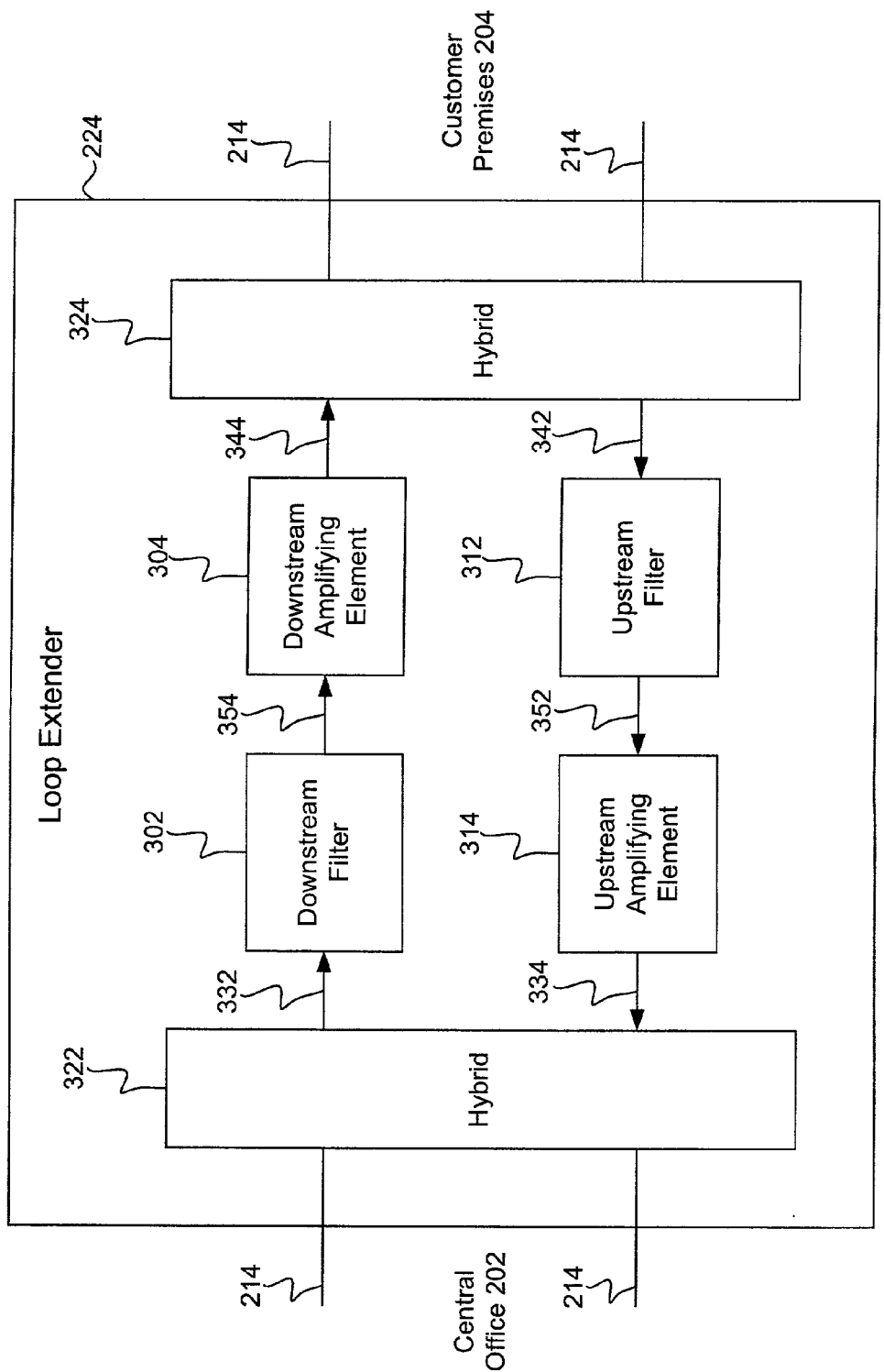
FIG. 3 illustrates one embodiment of a FIG. 2 loop extender.

FIG. 3 illustrates details of one embodiment of loop extender 224 of FIG. 2. As shown, loop extender 224 is coupled to local loop 214 between central office 202 and customer premises 204. Loop extender 224 is depicted as including a downstream filter 302, a downstream amplifying element or stage 304, an upstream filter 312, and an upstream amplifying element or stage 314. Filters 302 and 312 and amplifying elements 304 and 314 are disposed between a pair of electromagnetic hybrid couplers 322 and 324. Amplifying elements 304 and 314 may comprise amplifiers or amplifying equalizers.

In general, hybrid coupler 322 receives downstream DSL signals from central office 202 along local loop 214 and outputs the downstream DSL signals to downstream filter 302 along a line 332. Hybrid coupler 322 also receives amplified upstream DSL signals from upstream amplifying element 314 along a line 334 and transmits the upstream DSL signals onto local loop 214 for transmission to central office 202.

Similarly, hybrid coupler 324 receives upstream DSL signals from customer premises 204 along local loop 214 and outputs the upstream DSL signals to upstream filter 312 along a line 342. Hybrid coupler 324 also receives amplified downstream DSL signals from downstream amplifying element 304 along a line 344 and transmits the downstream DSL signals onto local loop 214 for transmission to customer premises 204.

As those skilled in the art will appreciate, where hybrid coupler 322 is imperfect, at least a portion of the upstream amplified DSL signal received via line 334 will leak through hybrid coupler 322 onto line 332. Likewise, where hybrid coupler 324 is imperfect, at least a portion of the downstream amplified DSL signal received via line 344 will leak through hybrid coupler 324 onto line 342. Without the presence of filters 302 and 312, this DSL signal leakage could cause a phenomenon known in the art as "singing"—that is oscillations caused by introducing gain into a bi-directional system due to signal leakage.

The signal leakage problem is overcome, or substantially alleviated, through the use of downstream filter 302 and upstream filter 312. In one version of Category 1 ADSL signals, ADSL upstream signals generally occupy the frequency spectrum between about 25–120 kHz and ADSL downstream signals generally occupy the frequency spectrum between about 150 kHz–1.104 MHz. Downstream filter 302 substantially prevents leaked upstream signals from being transmitted back to customer premises 204 by significantly attenuating signals between 25 kHz and 120 kHz for ADSL. Likewise, upstream filter 312 is configured to provide significant attenuation to signals between about 150 kHz–1.104 MHz for ADSL. For other varieties of DSL, such as VDSL, filters 302 and 312 respectively attenuate signals outside the downstream and upstream frequency bands, although the limits of these bands may be different than those for the ADSL variety.

In operation, loop extender 224 receives upstream DSL signals from customer premises 204 via hybrid 324, filters out, or substantially attenuates, signals in the downstream frequency band with upstream filter 312 and then passes the filtered upstream signal to upstream amplifying element 314 via a line 352 for amplification. Loop extender 224 then passes the amplified upstream DSL signal onto local loop 214 for transmission to central office 202. Similarly, loop extender 224 receives downstream DSL signals from central office 202 via hybrid 322, filters out, or substantially attenuates, signals in the upstream frequency band with downstream filter 302 and then passes the filtered downstream signal to downstream amplifying element 304 via a line 354 for amplification. Loop extender 224 then passes the amplified downstream DSL signal onto local loop 214 for transmission to customer premises 204.

Figure 4:
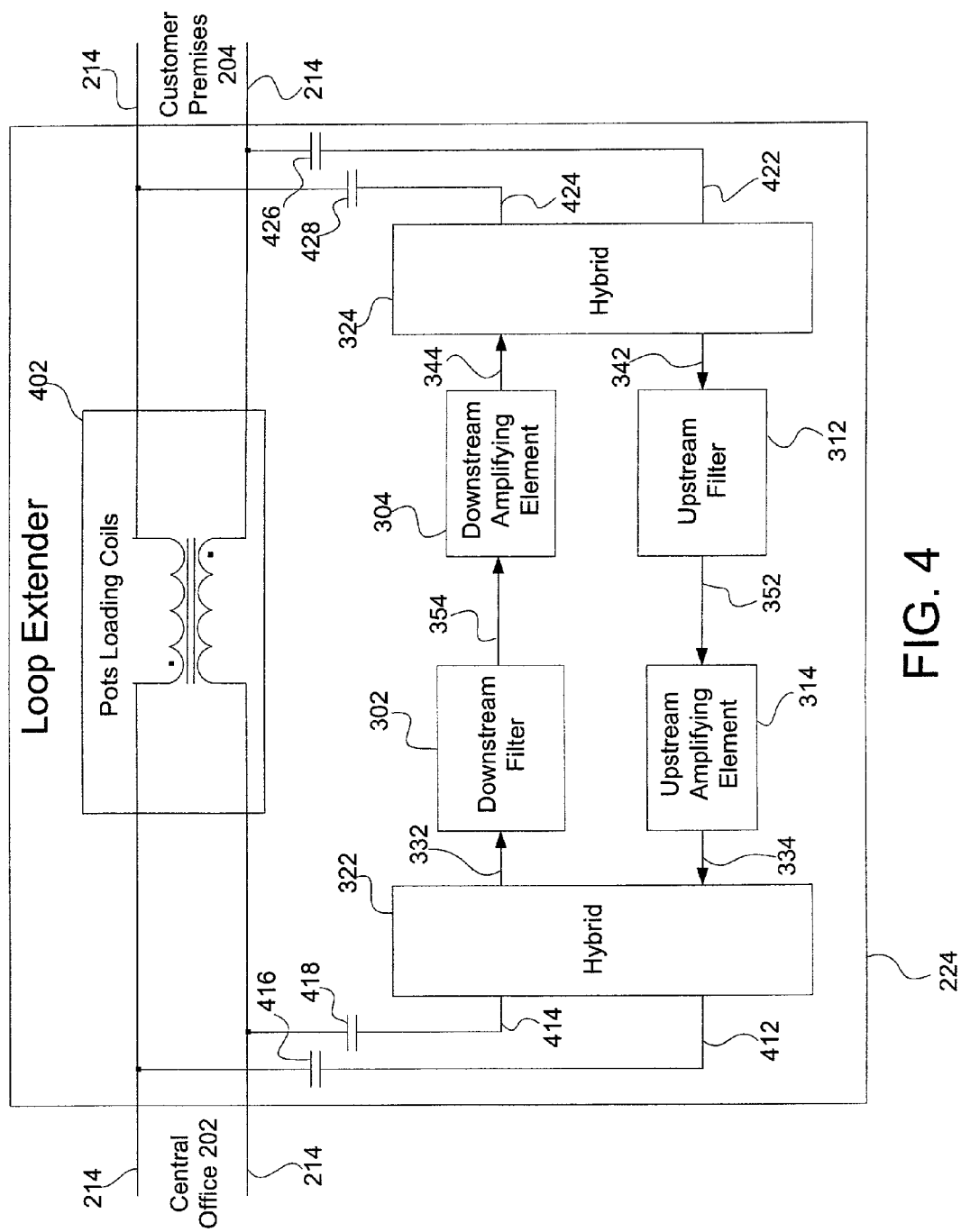
FIG. 4 illustrates another embodiment of a FIG. 2 loop extender.

FIG. 4 illustrates another embodiment of loop extender 224, which includes POTS loading coils 402. As shown, loop extender 224 of FIG. 4 includes POTS loading coils 402 coupled to local loop 214 to improve transmission of voice, or POTS, frequency signals over long local loop lengths, such as those longer than about 18,000 feet. In one embodiment, POTS loading coils 402 comprise loading coils having an inductance of about 88 mH.

Hybrid 322 is illustrated as being capacitively coupled to local loop 214 on the central office side of POTS loading coils 402 along lines 412 and 414. A capacitor 416 (100 nF) is disposed along line 412 and a capacitor 418 (100 nF) is disposed along line 414 to capacitively couple hybrid 322 to local loop 214 on the central office side of POTS loading coils 402.

Similarly, hybrid 324 is illustrated as being capacitively coupled to local loop 214 on the customer premises side of POTS loading coils 402 along lines 422 and 424. A capacitor 426 (100 nF) is disposed along line 422 and a capacitor 428 (100 nF) is disposed along line 424 to capacitively couple hybrid 324 to local loop 214 on the customer premises side of POTS loading coils 402.

Loop extender 224 of FIG. 4 may be advantageously employed in circumstances where local loop 214 already has conventional POTS loading coils coupled thereto. In this circumstance, loop extender 224 of FIG. 4 may simply replace the conventional POTS loading coils to provide both POTS loading coils and DSL signal amplification functionality. Indeed, POTS loading coils are conventionally disposed about every 6,000 feet along some long local loops to improve voice frequency transmission over long local loops. By replacing these conventional POTS loading coils with loop extender 224 of FIG. 4, a single device, namely loop extender 224 of FIG. 4, may provide both voice frequency transmission improvement and DSL signal amplification. Moreover, replacing existing POTS loading coils with loop extender 224 of FIG. 4 permits loop extender 224 to potentially use any housing or other hardware (not shown) associated with the previously existing POTS loading coils, thereby potentially facilitating installation of loop extender 224 of FIG. 4 along local loop 214.

Figure 5:
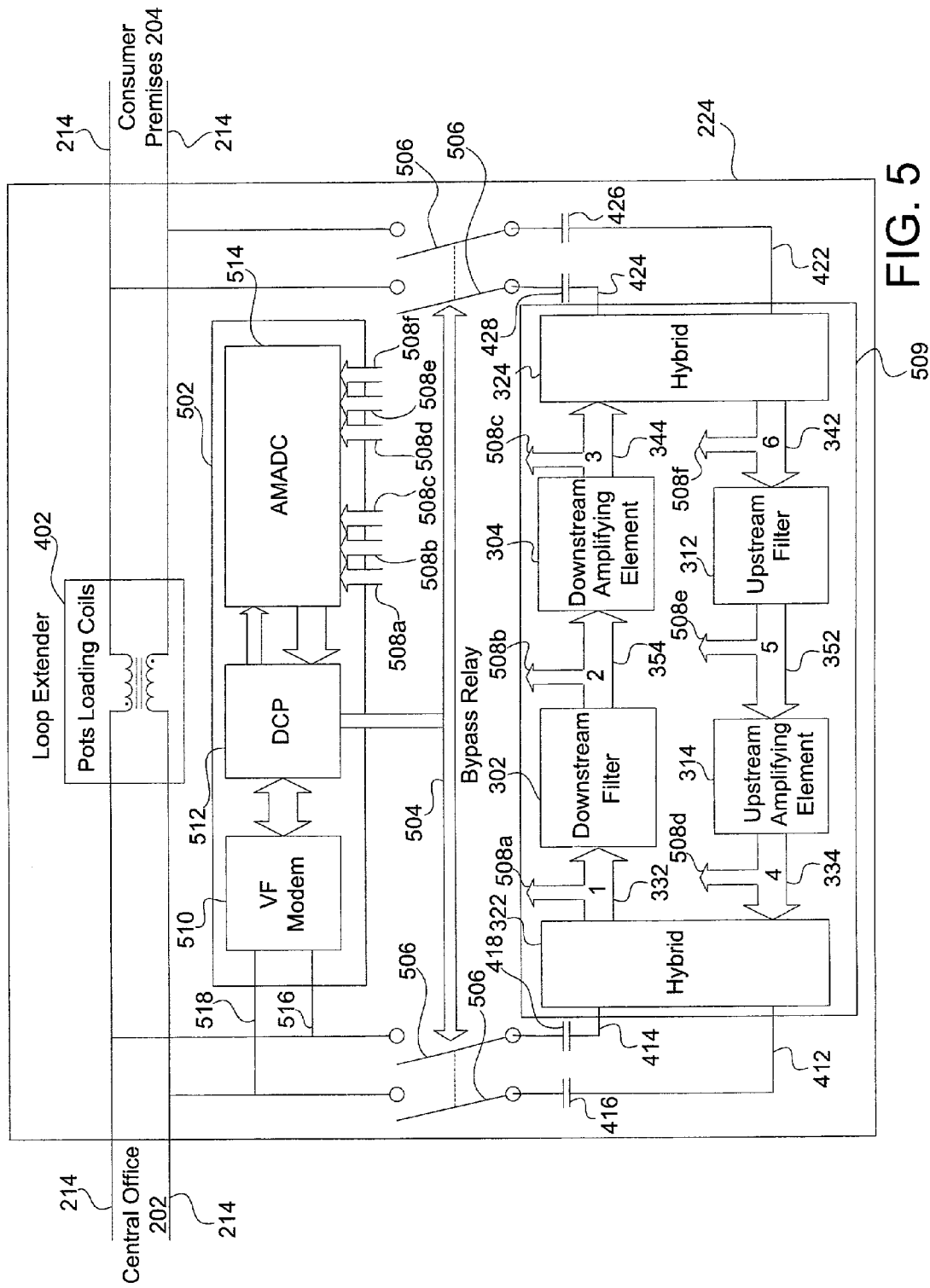
FIG. 5 illustrates another embodiment of a FIG. 2 loop extender.

FIG. 5 illustrates another embodiment of loop extender 224 which includes a diagnostic/control unit (DCU) 502, a bypass relay 504, bypass switches 506, diagnostic lines 508, and amplification circuitry 509. In the preferred embodiment, loop extender 224 has a unique IP address.

DCU 502 includes a voice frequency (VF) modem 510, a diagnostic/control processor (DCP) 512, and an analog Mux/Analog-to-Digital Converter (AMADC) 514 connected in series. As shown, loop extender 224 of FIG. 5 includes DCU 502 coupled to local loop 214 via lines 516 and 518 for communication with central office 202. For example, loop extender 224 communicates with central office 202 via VF modem 510, such as a Bell 202 type modem. Typically, VF modem 510 is operated in high-impedance mode. VF modem 510 receives control signals from central office 202 and sends the received control signals to DCP 512. In addition, VF modem 702 transmits signals to central office 202 in response to received control signals.

In one embodiment, DCP 512 includes a micro-controller processor, diagnostic and control circuitry, an associated non-volatile program memory, such as electrically erasable programmable read-only memory (EEPROM), a data memory such as random access memory (RAM), and interface circuitry to enable communication between VF modem 510 and the diagnostic and control circuitry. DCP 512 processes control signals received from VF modem 510 and sends the processed control signals to AMADC 514. In addition, DCP 512 receives signal data from AMADC 514, analyzes some or all of the received signal data, and sends the analyzed signal data to VF modem 510 for transmission to central office 202. DCP 512 may also send unanalyzed signal data to central office 202 for further processing. Data analysis will be discussed further below in conjunction with FIG. 6.

Furthermore, DCP 512 controls the state of switches 506 by activating and deactivating bypass relay 504. For example, when loop extender 224 is in a normal mode of operation, bypass relay 504 is deactivated, switches 506 are closed, and hybrids 322 and 324 are capacitively coupled to local loop 214. In the normal mode of operation, loop extender 224 amplifies DSL signals. When loop extender 224 is in a bypass mode of operation, bypass relay 504 is activated, switches 506 are open, and hybrids 322 and 324 are not electrically coupled to local loop 214. The bypass mode of operation will be discussed in more detail further below in conjunction with FIG. 6.

AMADC 514, upon receiving the processed control signals from DCP 512, selects one or more diagnostic lines 508, receives signal data via selected diagnostic lines 508, converts the received signal data to digital data, and sends the digital data to DCP 512 for analysis. For example, DCP 512 may instruct AMADC 514 to select diagnostic line 508c. AMADC 514 then receives signal data collected at a diagnostic point 3 in amplification circuitry 509 via diagnostic line 508c. In the FIG. 5 embodiment of the present invention, AMADC 514 is configured to receive signal data collected at diagnostic points 1–6 located in amplification circuitry 509 via diagnostic lines 508a–508f, respectively. However, the scope of the present invention covers signal data collected from any number of diagnostic points in amplification circuitry 509 via any number of diagnostic lines.

Figure 6:
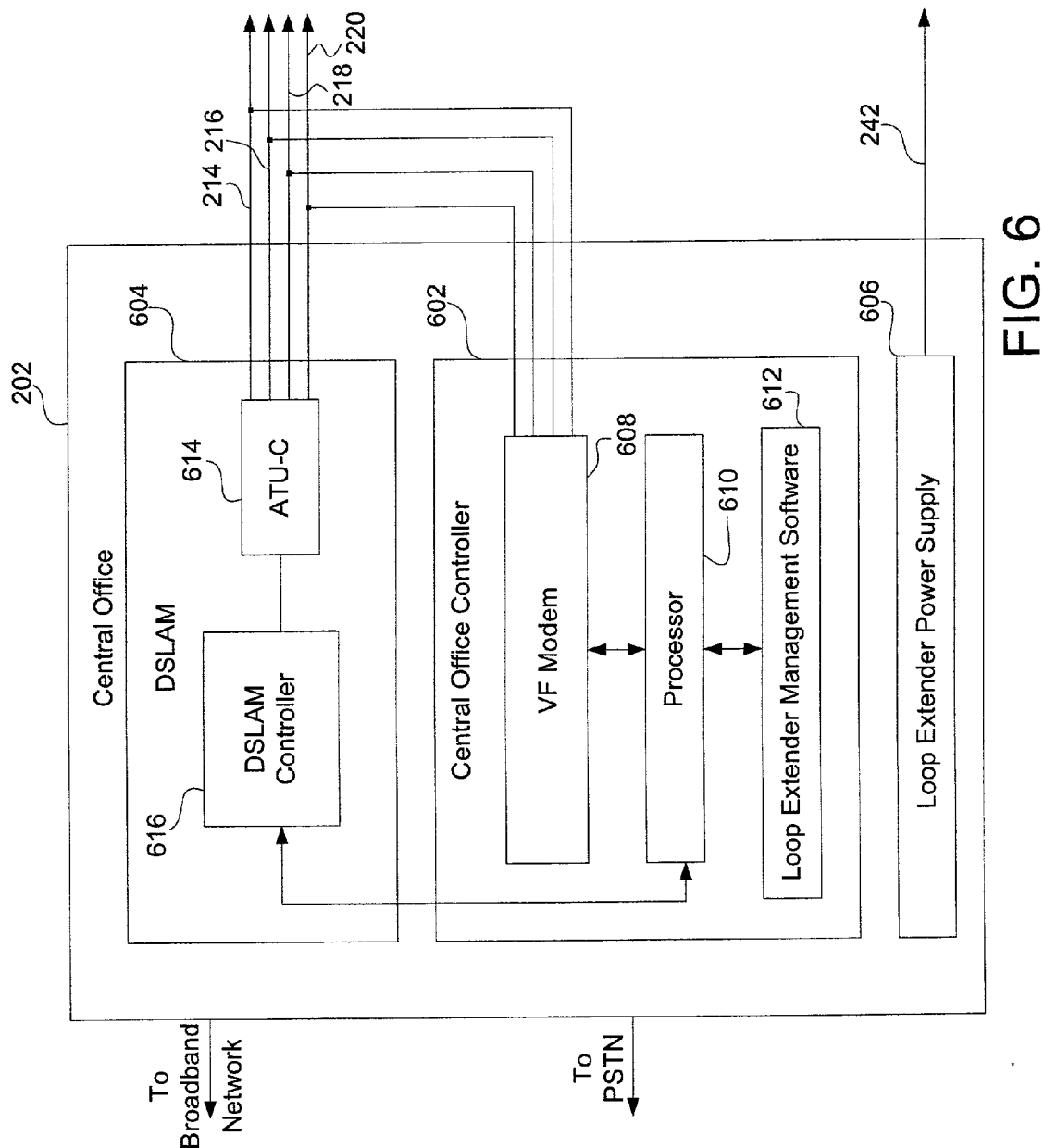
FIG. 6 illustrates one embodiment of a FIG. 2 central office.

FIG. 6 is a block diagram of one embodiment of central office 202. Central office 202 includes a Central Office Controller (COC) 602, a Digital Subscriber Line Access Multiplexer (DSLAM) 604 to transmit DSL signals onto local loops 214, 216, 218, and 220 and receive DSL signals from local loops 214, 216, 218, and 220, and a loop extender power supply 606 to provide power to power supply 240 via line 242.

COC 602 is configured to perform communications, control, and diagnostic (CCD) operations on a loop extender such as 224 by selecting loop extender 224 using the loop extender's IP address, generating control signals associated with a designated mode of loop extender operation, transmitting the control signals to the selected loop extender 224 to place the selected loop extender 224 in the designated mode of operation, and receiving signals and data from the selected loop extender 224 in response to the transmitted control signals.

In one embodiment, COC 602 includes a VF modem 608, a processor 610, and loop extender management software 612. Loop extender management software 612 runs on processor 610. Processor 610 generates control signals, selects a loop extender, determines an IP address of the selected loop extender, and sends the control signals to VF modem 608 for transmission to the selected loop extender. VF modem 608 transmits the control signals in the voice-frequency band. Voice-frequency band control signals may be transmitted to the selected loop extender via the POTS loading coils of one or more loop extenders on the local loop without significant control signal attenuation or impairment by the POTS loading coils. However, since simultaneous transmission of voice-frequency band control signals and POTS signals on a local loop may generate interference between the signals, thereby degrading signal quality, COC 602 transmits voice-frequency control signals to the selected loop extender via the selected loop extender's associated local loop when POTS signals are not being transmitted on the associated local loop. VF modem 608 may be a Bell 202 type modem, for example.

In operation, the control signals are received by the selected loop extender's VF modem 510 (FIG. 5). VF modem 510 sends the received control signals to DCP 512 for further processing. Furthermore, VF modem 510 may send signals to COC 602 in response to the received control signals. Since VF modem 510 assumes a high impedance state when idle, VF modem 510 does not interfere with POTS transmission on the local loop. However, since VF modem 510 drives the local loop with a 600 ohm impedance when responding to control signals received from COC 602, VF modem 510 may interfere with POTS communications on the local loop when active. Therefore, the selected loop extender's VF modem 510 communicates with COC 602 when POTS signals are absent from the local loop associated with the selected loop extender.

DSLAM 604 includes an ADSL Termination Unit—Central Office (ATU-C) 614 and a DSLAM controller 616. ATU-C 614 is an ADSL modem for receiving and transmitting DSL signals. DSLAM controller 616 controls the operation of the local loops via ATU-C 614 and communicates with processor 610. For example, processor 610 sends DSLAM controller 616 instructions regarding the operation of ATU-C 614. Furthermore, processor 610 receives local loop information from DSLAM controller 616. For example, COC 602 transmits control signals to a selected loop extender via VF modem 608 and associated local loop only when POTS signals are not present on the associated local loop. Therefore, processor 610 obtains POTS signal transmission information for the associated local loop from DSLAM controller 616 before COC 602 transmits control signals on the associated local loop. In another example, processor 610 may instruct DSLAM controller 616 to block POTS signal transmission on a local loop when COC 602 is conducting CCD operations on a loop extender located on the local loop.

In performing CCD operations, COC 602 may place loop extender 224 in one of several modes of operation. For example, COC 602 may place loop extender 224 in Bypass Mode by sending loop extender 224 control signals that instruct DCP 512 to activate bypass relay 504. Upon activation, bypass relay 504 opens switches 506 and electrically decouples hybrids 322 and 324 from local loop 214. A loop extender in Bypass Mode does not amplify DSL signals. A loop extender may be placed in Bypass Mode if the loop extender is not needed, malfunctioning, or is taken off line for scheduled maintenance, for example. Furthermore, if a loop extender is in Bypass Mode, COC 602 may place the loop extender in normal mode by sending control signals that instruct DCP 512 to deactivate bypass relay 504.

COC 602 may place loop extender 224 in Signal Measurement Mode (SMM). COC 602 places loop extender 224 in SMM to extract loop extender performance data from DSL signals sampled at diagnostic points 1–6 in amplification circuitry 509. Typically, COC 602 does not place loop extender 224 in SMM unless DSL signals are present on local loop 214. For example, COC 602 sends control signals to loop extender's VF modem 510 via local loop 214. VF modem 510 sends the control signals to DCP 512, and DCP 512 instructs AMADC 514 to select one or more diagnostic lines 508a–508f. AMADC 514 then samples DSL signals at diagnostic points 1–6 via selected diagnostic lines 508a–508f, and sends the sampled data to DCP 512. DCP 512 analyzes the sampled data according to criteria specified by the control signals. For example, DCP 512 may compute an average power, a peak power, a root-mean-square (rms) power, a peak-to-rms power ratio, and a power spectral density. The scope of the present invention includes other data analysis criteria well known in the art. DCP 512 sends the analyzed data to COC 602 via VF modem 510 and local loop 214. DCP 512 may also send unanalyzed data to COC 602 via local loop 214. COC 602 uses the analyzed and unanalyzed data to determine performance of loop extender 224 and to determine other loop extender configurations for maximum loop extender performance. For example, COC 602 may determine other loop extender configurations by computing adjustments to the electrical parameters that affect the performance of the hybrids, upstream amplifiers and filters, and downstream amplifiers and filters.

COC 602 may place loop extender 224 in a Power Analysis Mode. COC 602 places loop extender 224 in Power Analysis Mode to analyze loop extender power consumption by measuring currents and voltages at several diagnostic points 1–6. For example, AMADC 514 receives current and voltage data measured at several diagnostic points 1–6 via diagnostic lines 508a–508b. AMADC 514 sends the current and voltage data to DCP 512. DCP 512 uses the current and voltage data to compute power consumption data and sends the power consumption data to COC 602 via local loop 214. COC 602 may use the power consumption data to remotely identify problems with amplification circuitry 509 performance so that technicians may be dispatched to the proper location to repair or replace faulty equipment.

In an alternate embodiment, COC 602 may include a voltage source (not shown) coupled to a local loop to generate a direct current over the local loop. COC 602 places loop extender 224 associated with the local loop in a Power Analysis Mode, and instructs loop extender 224 via control signals to measure current and voltages at one or more diagnostic points. Loop extender 224 sends the measured current and voltage values to COC 602. Processor 610 then determines the local loop resistance between the voltage source and loop extender 224 based upon the received current and voltage values and the voltage generated by the voltage source. COC 602 may also compute the local loop length between central office 202 and loop extender 224 based upon the local loop's gauge of wire and the computed local loop resistance.

The invention has been explained above with reference to preferred embodiments. Other embodiments will be apparent to those skilled in the art in light of this disclosure. The present invention may readily be implemented using configurations other than those described in the preferred embodiments above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A system for improving transmission of DSL signals over a local loop, the system comprising:
   a loop extender with communications, control, and diagnostic functionality, wherein the loop extender comprises:
      amplification circuitry to amplify a digital subscriber line signal on a local loop;
      an analog multiplexer/analog-to-digital (AMADC) converter coupled to the amplification circuitry to sample the digital subscriber loop signal within the amplification circuitry; and
      a diagnostic/control processor (DCP) coupled to the analog multiplexer/analog-to-digital converter to analyze the sampled digital subscriber loop signal and to evaluate the amplification circuitry.

2. The system of claim 1, further comprising a central office controller coupled to the loop extender via the local loop for controlling the loop extender, wherein the central office controller comprises:
   a modem for communication with the loop extender;
   a processor coupled to the modem; and
   loop extender management software executable by the processor.

3. The system of claim 2, wherein the modem is coupled to the local loop to communicate in a voice-frequency band.

4. The system of claim 2, wherein the processor is coupled to the modem to generate control signals.

5. The system of claim 4, wherein the central office controller is configured to transmit the control signals to the loop extender via the local loop when POTS signals are not present on the local loop.

6. The system of claim 2, further comprising:
   an ATU-C coupled to the local loop configured to receive and transmit the DSL signals; and
   a DSLAM controller coupled to the processor and the ATU-C configured to control access to the local loop.

7. The system of claim 6, wherein the processor is coupled to the DSLAM controller to receive local loop information from the DSLAM controller.

8. The system of claim 6, wherein the processor is coupled to the DSLAM controller to send instructions to the DSLAM controller for operating the ATU-C.

9. The system of claim 5, wherein the loop extender further comprises:
   a POTS loading coil adapted to be coupled to the local loop for improving transmission of POTS band signals over the local loop; and
   bypass switches to capacitively couple the amplification circuitry to the local loop.

10. The system of claim 9, further comprising:
    a modem coupled to the local loop and the diagnostic/control processor for communication with the central office controller; and
    diagnostic lines to couple the analog multiplexer/analog-to-digital converter (AMADC) to the amplification circuitry for sampling DSL signal data.

11. The system of claim 10, wherein the DCP is coupled to the AMADC to process the sampled DSL signal data to compute average power.

12. The system of claim 10, wherein the DCP is coupled to the AMADC to process the sampled DSL signal data to compute peak power.

13. The system of claim 10, wherein the DCP is coupled to the AMADC to process the sampled DSL signal data to compute root-mean-square power.

14. The system of claim 10, wherein the DCP is coupled to the AMADC to process the sampled DSL signal data to compute power spectral density.

15. The system of claim 10, further comprising a bypass relay for coupling the DCP to the bypass switches.

16. The system of claim 15, wherein the DCP, in response to control signals from the central office controller, is configured activate the bypass relay to uncouple the amplification circuitry from the local loop.

17. The system of claim 15, wherein the DCP, in response to control signals from the central office controller, is configured deactivate the bypass relay to couple the amplification circuitry to the local loop.

18. A method for improving transmission of DSL signals over a local loop, comprising:
configuring a loop extender with communications, control, and diagnostic functionality;
sampling a digital subscriber loop signal within amplification circuitry of the loop extender to evaluate the amplification circuitry; and
using the sampled DSL signals to improve transmission of the DSL signals over the local loop.

19. The method of claim 18, further comprising:
controlling the loop extender with a central office controller coupled to the loop extender via the local loop;
generating control signals via a processor; and
transmitting the control signals to the loop extender via the local loop when POTS signals are not present on the local loop.

20. The method of claim 19, further comprising transmitting the control signals in a voice-frequency band.

21. The method of claim 19, further comprising:
receiving and transmitting DSL signals via an ATU-C coupled to the local loop; and
controlling access to the local loop via a DSLAM controller coupled to the processor and the ATU-C.

22. The method of claim 21, wherein the processor receives local loop information from the DSLAM controller.

23. The method of claim 21, wherein the processor sends instructions to the DSLAM controller for operating the ATU-C.

24. The method of claim 19, further comprising:
improving transmission of POTS band signals over the local loop via a POTS loading coil coupled to the local loop;
providing communications, control, and diagnostic functionality via a diagnostic/control unit coupled to the local loop; and
providing DSL signal amplification via the amplification circuitry capacitively coupled to the local loop via bypass switches.

25. The method of claim 24, wherein providing communications, control, and diagnostic functionality further comprises:
receiving the control signals from the central office controller;
processing the received control signals;
sampling DSL signal data in accordance with the processed control signals; and
processing the sampled DSL signal data.

26. The method of claim 25, wherein processing the sampled DSL signal data comprises computing average power.

27. The method of claim 25, wherein processing the sampled DSL signal data comprises computing peak power.

28. The method of claim 25, wherein processing the sampled DSL signal data comprises computing root-mean-square power.

29. The method of claim 25, wherein processing the sampled DSL signal data comprises computing power spectral density.

30. The method of claim 25, further comprising uncoupling the amplification circuitry from the local loop in accordance with the processed control signals.

31. The method of claim 25, further comprising coupling the amplification circuitry to the local loop in accordance with the processed control signals.

32. A system for improving transmission of DSL signals over a local loop, the system comprising:
a central office controller, the central office controller including,
a first modem coupled to the local loop,
a processor coupled to the first modem,
loop extender management software executable by the processor for generating control signals,
an ATU-C coupled to the local loop configured to receive and transmit DSL signals, and
a DSLAM controller coupled to the processor and the ATU-C configured to control access to the local loop; and
a loop extender coupled to the central office controller via the local loop, the loop extender including,
a POTS loading coil adapted to be coupled to the local loop for improving transmission of POTS band signals over the local loop,
amplification circuitry capacitively coupled to the local loop via bypass switches for providing DSL signal amplification,
a second modem coupled to the local loop for receiving the control signals,
an AMADC coupled to the amplification circuitry for sampling DSL signal data within the amplification circuitry via diagnostic lines, and
a DCP coupled to the second modem and the AMADC for processing the control signals received via the second modem and analyzing the sampled DSL signal data from the AMADC to evaluate the amplification circuitry.

33. The system of claim 32, wherein the first modem and second modem are coupled to the local loop to communicate in a voice-frequency band.

34. The system of claim 32, wherein the central office controller is coupled to the local loop to transmit the control signals to the loop extender via the local loop when POTS signals are not present on the local loop.

35. The system of claim 32, wherein the DCP is coupled to the AMADC to process the sampled DSL signal data to compute average power.

36. The system of claim 32, wherein the DCP is coupled to the AMADC to process the sampled DSL signal data to compute peak power.

37. The system of claim 32, wherein the DCP is coupled to the AMADC to process the sampled DSL signal data to compute root-mean-square power.

38. The system of claim 32, wherein the DCP is coupled to the AMADC to process the sampled DSL signal data to compute power spectral density.

39. The system of claim 32, further comprising a bypass relay for coupling the DCP to the bypass switches.

40. The system of claim 39, wherein the DCP, in response to control signals from the central office controller, is configured to activate the bypass relay to uncouple the amplification circuitry from the local loop.

41. The system of claim 39, wherein the DCP, in response to control signals from the central office controller, is configured to deactivate the bypass relay to couple the amplification circuitry to the local loop.

42. A method for improving transmission of DSL signals over a local loop, the method comprising:
   generating control signals in a central office;
   transmitting the control signals and DSL signals over the local loop;
   providing DSL signal amplification via amplification circuitry coupled to the local loop;
   sampling DSL signals within the amplification circuitry in accordance with the control signals received by a diagnostic/control unit coupled to the amplification circuitry;
   processing the sampled DSL signals to evaluate amplification circuitry performance; and
   using the processed DSL signals to improve transmission of the DSL signals over the local loop.

43. The method of claim 42, wherein processing the sampled DSL signals comprises computing average power.

44. The method of claim 42, wherein processing the sampled DSL signals comprises computing peak power.

45. The method of claim 42, wherein processing the sampled DSL signals comprises computing root-mean-square-power.

46. The method of claim 42, wherein processing the sampled DSL signals comprises computing power spectral density.

47. The method of claim 42, further comprising uncoupling the amplification circuitry from the local loop in accordance with control signals received by the diagnostic/control unit.

48. The method of claim 42, further comprising coupling the amplification circuitry to the local loop in accordance with control signals received by the diagnostic/control unit.

49. A system for improving transmission of DSL signals, the system comprising:
   means for generating control signals;
   means for transmitting the control signals and DSL signals;
   means for amplifying the DSL signals;
   means for processing the control signals;
   means for sampling the DSL signals within the means for amplifying in accordance with the processed control signals; and
   means for processing the sampled DSL signals to evaluate the means for amplifying.

* * * * *